United States Patent
Moroz

(10) Patent No.: US 7,690,895 B2
(45) Date of Patent: Apr. 6, 2010

(54) MULTI-PIECE PASSIVE LOAD REDUCING BLADES AND WIND TURBINES USING SAME

(75) Inventor: Emilian Mieczyslaw Moroz, San Diego, CA (US)

(73) Assignee: General Electric Company, Schenectady, NY (US)

( * ) Notice: Subject to any disclaimer, the term of this patent is extended or adjusted under 35 U.S.C. 154(b) by 1019 days.

(21) Appl. No.: 11/193,884

(22) Filed: Jul. 29, 2005

(65) Prior Publication Data
US 2007/0025856 A1  Feb. 1, 2007

(51) Int. Cl.
*B64C 27/46* (2006.01)
(52) U.S. Cl. .................. 416/132 B; 416/228; 416/230; 416/237
(58) Field of Classification Search .............. 416/228, 416/229 R, 230, 241 R, 224, 237, 132 B
See application file for complete search history.

(56) References Cited

U.S. PATENT DOCUMENTS

| | | | | |
|---|---|---|---|---|
| 4,168,939 A | * | 9/1979 | Schmitz et al. | 416/228 |
| 4,324,528 A | * | 4/1982 | Svenning | 416/132 B |
| 4,366,387 A | * | 12/1982 | Carter et al. | 290/55 |
| 4,474,536 A | * | 10/1984 | Gougeon et al. | 416/226 |
| 4,580,944 A | * | 4/1986 | Miller | 416/134 A |
| 4,878,808 A | * | 11/1989 | Wildenauer | 416/132 B |
| 4,880,355 A | * | 11/1989 | Vuillet et al. | 416/228 |
| 5,096,381 A | * | 3/1992 | Svenning | 416/135 |
| 5,137,427 A | * | 8/1992 | Shenoy | 416/223 R |
| 5,269,657 A | * | 12/1993 | Garfinkle | 416/226 |
| 6,116,857 A | * | 9/2000 | Splettstoesser et al. | 416/228 |
| H002057 H | | 1/2003 | Veers et al. | |
| 6,902,370 B2 | | 6/2005 | Dawson et al. | |
| 7,186,086 B2 | | 3/2007 | Yoshida | |
| 7,364,407 B2 | | 4/2008 | Grabau et al. | |
| 2001/0050322 A1 | * | 12/2001 | Carter, Jr. | 244/17.25 |
| 2005/0180854 A1 | * | 8/2005 | Grabau et al. | 416/241 R |
| 2006/0067828 A1 | * | 3/2006 | Wetzel | 416/223 R |
| 2008/0069699 A1 | * | 3/2008 | Bech | 416/229 R |
| 2008/0206062 A1 | | 8/2008 | Sanz Pascual et al. | |
| 2008/0240923 A1 | | 10/2008 | Bonnet | |
| 2008/0240925 A1 | | 10/2008 | Kita et al. | |

OTHER PUBLICATIONS

Zuteck, M; "Adaptive Blade Concept Assessment: Curved Planform Induced Twist Investigation"; Oct. 2002; pp. 1-24; Sand 2002-2996.
"Wind Energy in the Netherlands"; pp. 41-128; Untitled journal; Undated.

* cited by examiner

*Primary Examiner*—Igor Kershteyn
(74) *Attorney, Agent, or Firm*—James McGinness, Esq.; Armstrong Teasdale LLP

(57) ABSTRACT

A wind turbine includes a tower and a generator on the tower. The generator includes a rotor with at least one assembled blade. The assembled blade includes at least an inner piece, an outer piece, and a joint configured for assembly and disassembly of the inner piece and said outer piece. The outer piece is configured to provide passive load alleviation.

20 Claims, 3 Drawing Sheets

MULTI-PIECE PASSIVE LOAD REDUCING BLADES AND WIND TURBINES USING SAME

BACKGROUND OF THE INVENTION

This invention relates generally to wind turbines, and more particularly, to wind turbines having rotor blades built in more than one piece and with load-reducing characteristics.

Recently, wind turbines have received increased attention as an environmentally safe and relatively inexpensive means of extracting energy from wind. With this growing interest, considerable efforts have been made to develop wind turbines that are reliable and efficient.

Generally, a wind turbine includes a rotor having multiple blades. The rotor is mounted to a drive train located within a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is fed into a utility grid. Some turbines utilize generators that are directly coupled to the rotor without using a gearbox.

As the power generating capacity of wind turbines increases, the dimensions of their rotor blades and other components also increase. Furthermore, to maximize energy capture in the majority of wind regimes, it is beneficial to have as large a rotor diameter as possible for a particular generator rated capacity. At some point, however, practical transportation and logistics limits may be exceeded. Moreover, as physical size increases, inertial and aerodynamic loads that the structure must carry rise. These limitations lead to constraints on both energy production ratings and the rotor diameter for a particular rated capacity.

BRIEF DESCRIPTION OF THE INVENTION

Therefore, the present invention, in one aspect, provides a blade kit for a rotor. The blade kit includes at least an inner piece, an outer piece, and a joint configured for joining the inner piece and outer piece together, wherein the blade kit is configured to provide passive load alleviation when assembled.

In another aspect, the present invention provides a wind turbine that includes a tower and a generator on the tower. The generator includes a rotor with at least one assembled blade. The assembled blade includes at least an inner piece, an outer piece, and a joint configured for assembly and disassembly of the inner piece and said outer piece. The outer piece is configured to provide passive load alleviation.

In still another aspect, the present invention provides a method for assembling a rotor blade on a rotor of a wind turbine. The method includes transporting at least two unassembled pieces of a blade. The unassembled pieces including an outer blade part having an aft sweep and an inner blade part. The method also includes assembling at least the outer blade part and the inner blade part into a blade and onto the rotor of the wind turbine.

It will be appreciated from the description that various configurations of the present invention provide load reducing characteristics that can facilitate larger than normal rotor diameters in wind turbines and logistical advantages in transportation that offset the added cost and complexity of a blade having a joint.

BRIEF DESCRIPTION OF THE DRAWINGS

In FIG. 2, the plane of the paper is the plane of the rotor. The line at the left end of the graph can be interpreted as an edge of a blade hub or blade root bearing. The X-axis corresponds to the pitch axis P, whereas a line through the blade and denoted by E represents the elastic or structural axis of the blade. The trailing edge of each blade is at the top of the figure, and the leading edge is at the bottom. The blades are thus facing downward.

DETAILED DESCRIPTION OF THE INVENTION

As used herein, the term "sweep" refers to an angle of an elastic axis relative to a pitch axis of a blade, where the "elastic axis" refers to a locus of points defining a torsional center at each span-wise section of the blade.

Figure 1:
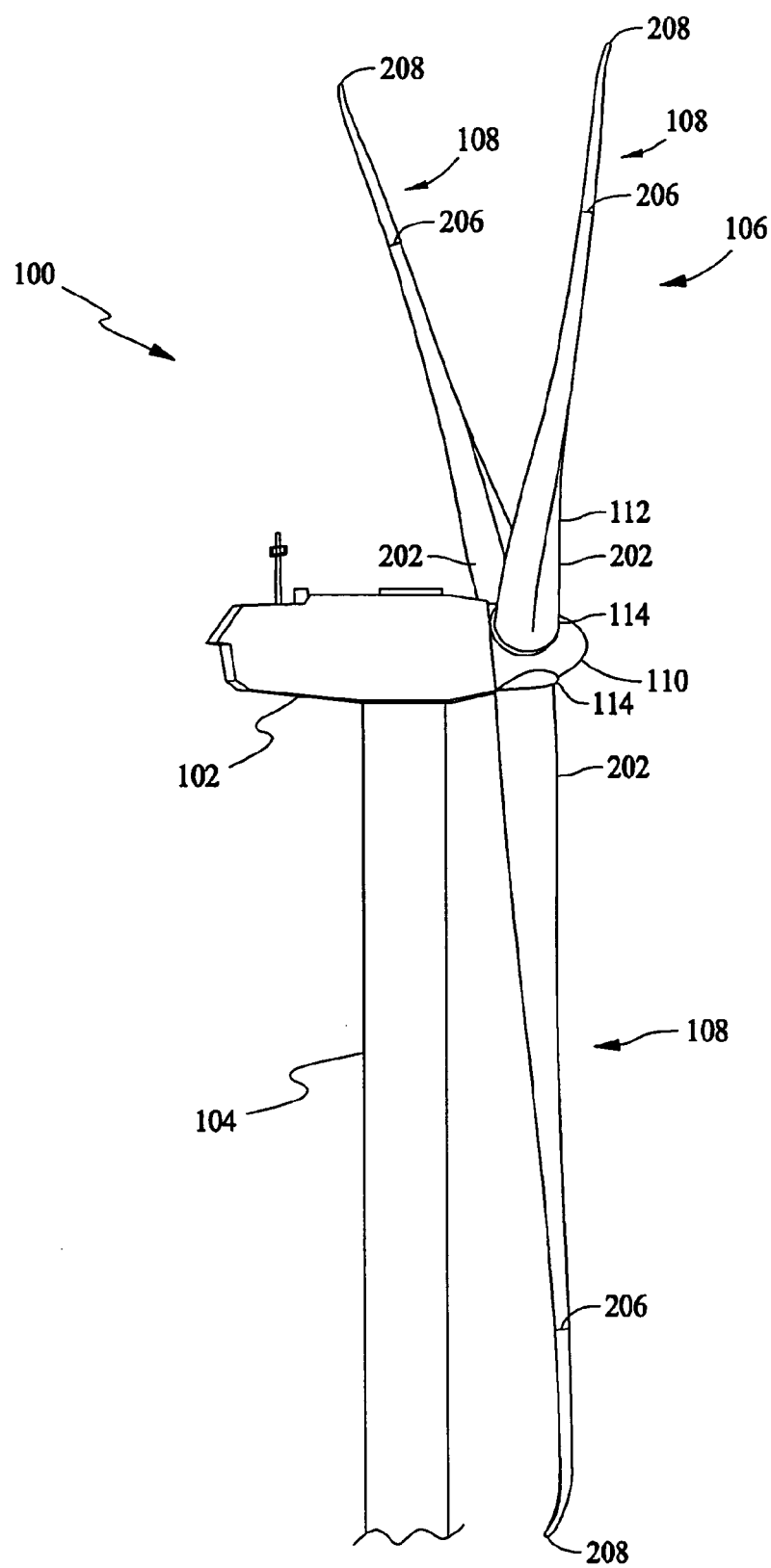
FIG. 1 is a drawing of a configuration of a wind turbine of the present invention.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention. Blades 108 comprise a plurality of pieces, including an inner piece 202 and an outer piece 204, which allow a large blade such as blade 108 to be more conveniently shipped in pieces and assembled on site.

Some components of wind turbine 100 in the illustrated configuration are housed in nacelle 102 atop tower 104 of wind turbine 100. The height of tower 104 is selected based upon factors and conditions known in the art. In some configurations, one or more microcontrollers comprise a control system are used for overall system monitoring and control including pitch and speed regulation, high-speed shaft and yaw brake application, yaw and pump motor application and fault monitoring. Alternative distributed or centralized control architectures are used in some configurations. The pitches of blades 108 can be controlled individually in some configurations. Hub 110 and blades 108 together comprise wind turbine rotor 106. Rotation of rotor 106 causes a generator (not shown in the figures) to produce electrical power.

Figure 2:
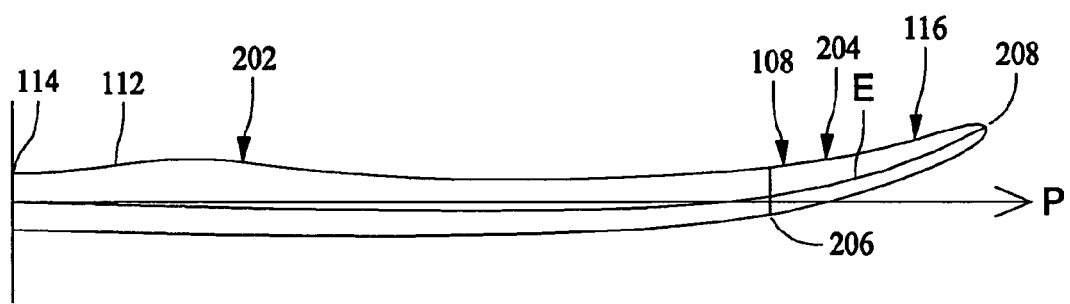
FIG. 2 is graphical representation of a continuously swept multi-piece blade configuration of the present invention suitable for use in the wind turbine configuration represented in FIG. 1.

In some configurations of the present invention and referring to FIGS. 1 and 2, multi-piece rotor blades 108 of a wind turbine 100 are swept forward relative to an elastic axis E (in a plane of rotation of the rotor) in an inboard region 112 of inner part 202. When swept forward by a proper amount, a pitching moment of blade 108 at their roots 114 due to sweep is reduced or eliminated. Forward sweep of inboard regions 112 of rotor blades 108 do not produce adverse twist of measurable magnitude of regions 112 because blade roots 114 are torsionally extremely rigid. Because the sweep of outboard sections 116 of outer part 204 remains unchanged relative to sections further inboard, twist induced by the outboard sweep also remains unchanged.

Blade or blades 108 thus, in some configurations, have passive load reducing characteristics. The blade can be manufactured and transported in at least two pieces 202 and 204, if desired for logistical or fabrication reasons, and advantageously assembled at a joint 206. Joint 206 can be any suitable form of joint configured to assemble blade parts 202 and 204 together, but may also be specifically tailored and fabricated to produce beneficial flexural characteristics. For example, an overlap joint with flush bolts may be used. In some configurations, joint 206 is located at around 70% radius. An outer part 204 of blade 108 has an aft sweep to provide passive load alleviation. As an optional design choice, inboard part 202 of blade 108 can be swept slightly forward to provide a torsional moment that acts in an opposite direction to that at blade tip 208. This optional design choice, if provided, helps balance torsional load impact on the pitch system of a wind turbine.

More particularly, some configurations of the present invention offset the cost of providing joint 206 in blade 108 by introducing load reducing features that provide system benefits. For example, passive load alleviation provides both an operating and an idling load reduction that can further help in optimizing the cost of wind turbine 100.

Also, some configurations of the present invention provide a blade 108 having a section 202 inboard of joint 206 of a conventional GRP (glass reinforced plastic) construction. Outboard of joint 206, a different material and/or construction is used is used for section 204. For example, outboard part 204 comprises a hybrid carbon glass construction in some configurations, or as much as 100% carbon construction, for weight reduction. Outer part, 204 in some configurations, reduces static moment through the use of lighter weight materials than section 202 and/or provides an aft sweep to provide additional passive load alleviation. The sweep can incorporate a continuous curvature that approximates a linear sweep angle of, for example, 25 degrees, to provide an aesthetic appearance, as illustrated in FIG. 2. In other configurations (not shown), a linear sweep is provided.

Figure 3:
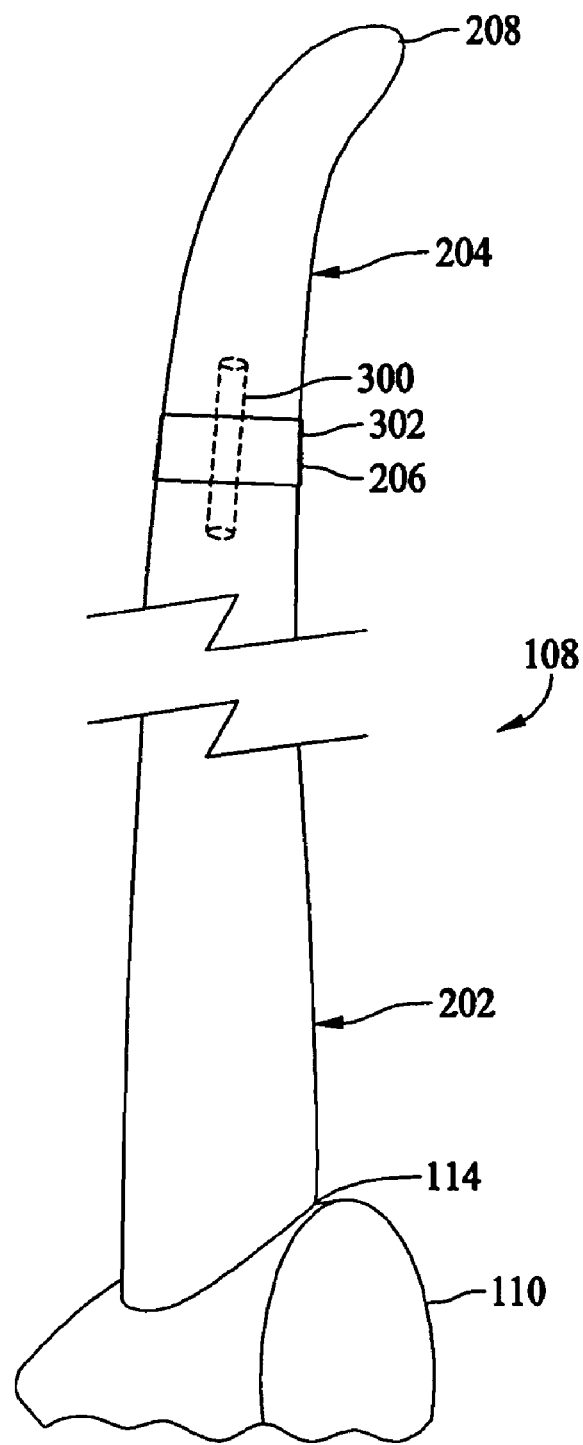
FIG. 3 is a drawing of a configuration of an assembled blade configuration of the present invention.

In some configurations and referring to FIG. 3, at joint 206 between inboard or inner part 202 and outboard or outer part 204, a carbon torque tube 300 or a tube of another suitable material is used. Torque tube 300 (shown in dashed lines in FIG. 3 because it is a separate member inserted inside both inner part 202 and outer part 204) exhibits a torsional stiffness that is lower than a conventional section might provide at this radial station. An effect of this lower torsional stiffness at joint 206 is that an overall blade twist profile may exhibit a discontinuity between inner part 202 and outer part 204. A flexible fairing 302 is provided in some configurations to span joint 206 to minimize a noise impact from such a discontinuity and to avoid water and ice from interfering with joint 206. The actual torsional stiffness of joint 206 is optimized in some configurations to achieve or at least approximate a target pitch value to feather under some extreme load condition. An overall blade twist distribution would account for a degree of passive pitch to feather from normal operating loads so as to maximize or at least increase energy capture.

Some configurations also provide an inboard part of the blade that is swept slightly forward to provide a torsional moment that acts in the opposite direction to that at the tip, to balance the torsional load impact on the pitch system.

Blades 108 in some configurations include a moderate sweep inboard on the order of 1 to 2 degrees relative to blade pitch axis P, while outboard sections 116 are swept aft 20 degrees relative to pitch axis P. Configurations of the present invention are applicable to blades 108 of any length. The pieces of blade 108 comprise a blade kit that can be shipped unassembled in separate pieces, thereby reducing the length of vehicle needed for shipping, and the pieces assembled on site on a rotor of a wind turbine at a wind farm. In particular, at least two unassembled pieces 202, 204 of a blade 108 are transported, wherein the pieces include a outer blade part 204 having an aft sweep and an inner blade part 202. Outer blade part 204 and inner blade part 202, and any other parts of blade 108, are assembled onto rotor 110 of wind turbine 100. Thus, in some configurations, the assembly of outer blade part 204 and inner blade part 202 further includes joining outer blade part 204 and inner blade part 202 using a torque tube 300 that exhibits a selected torsional stiffness.

Also, in some configurations, the present invention provides a method for assembling a rotor blade 108 on a rotor 110 of a wind turbine. The method includes transporting at least two unassembled pieces 202, 204 of blade 108. The unassembled pieces include an outer blade part 204 and an inner blade part 202. Outer blade part 204 is made from a dissimilar material and/or structure from inner blade part 202. The method also includes assembling at least outer blade part 204 and inner blade part 202 into a blade 108 and onto a rotor 110 of a wind turbine 100.

It will thus be appreciated from the description that various configurations of the present invention provide logistical advantages in shipment of blades to wind farms. Although there is some cost involved in utilizing a joint to join blade parts, load reducing features provide an advantage that offsets the cost of the joint. The cost advantage can be taken through logistical benefits alone or through a combination of logistical benefits and increased rotor diameter arising from the load reducing characteristics. The use of a passive load alleviation feature provides both operating and idling load reduction benefits that can further help in the cost optimization of a wind turbine system.

While the invention has been described in terms of various specific embodiments, those skilled in the art will recognize that the invention can be practiced with modification within the spirit and scope of the claims.

What is claimed is:

1. A blade kit for a rotor, said blade kit comprising a blade extending axially from a blade root to a blade tip and extending chordwise from a leading edge to a trailing edge and having an airfoil shape along the entire chordwise span, said blade further comprising at least an inner piece, an outer piece, and a joint defined between said inner piece and said outer piece, said inner piece extends from said blade root to said joint, said blade root for coupling to a hub of the rotor, said outer piece extends from said joint to said blade tip, said outer piece is twistable relative to said inner piece to approximate a target pitch value when a given load condition occurs when said blade is fully assembled and coupled to the hub.

2. A blade kit in accordance with claim 1 wherein said outer piece is aft swept.

3. A blade kit in accordance with claim 1 wherein said inboard region of said assembled blade provides a torsional moment that acts in an opposite direction to a torsional moment at said blade tip when said assembled blade is mounted on the rotor.

4. A blade kit in accordance with claim 1 wherein said inboard region is torsionally rigid.

5. A blade kit in accordance with claim 1 wherein said joint is configured to assemble said inner piece and said outer piece at about 70% of a radius of said assembled blade.

6. A blade kit in accordance with claim 1 wherein said outer piece is aft swept with a linear sweep.

7. A blade kit in accordance with claim 6 wherein an angle of the linear sweep is approximately 25 degrees.

8. A blade kit in accordance with claim 1 wherein said outer piece is constructed from at least one of a lighter weight material and a different structure than said inner piece.

9. A blade kit in accordance with claim 1 wherein said outer piece is aft swept in a continuous curvature.

10. A blade kit in accordance with claim 1 wherein said joint comprises a torque tube having a torsional stiffness selected to allow said outer piece to achieve or approximate the target pitch value.

11. A blade kit in accordance with claim 1 wherein said outer piece is aft swept and said inner piece is forward swept to provide a torsional moment acting in an opposite direction to that of said outer piece, to balance a torsional load of said assembled blade.

12. A blade kit in accordance with claim 1 further comprising a flexible fairing configured to span said joint at said assembled blade.

13. A wind turbine comprising:
a tower; and
a generator on said tower, said generator comprising a rotor with at least one assembled blade extending axially from a blade root to a blade tip and extending chordwise from a leading edge to a trailing edge and having an airfoil shape along the entire chordwise span, said blade comprising an inner piece, an outer piece, and a joint defined between said inner piece and said outer piece, said inner piece extends from said blade root to said joint, said blade root for coupling to a hub of said rotor, said outer piece extends from said joint to said blade tip, said outer piece is twistable relative to said inner piece to approximate a target pitch value when a given load condition occurs when said blade is fully assembled and coupled to said hub.

14. A wind turbine in accordance with claim 13 wherein said outer piece is aft swept.

15. A wind turbine in accordance with claim 13 wherein said inboard region is torsionally rigid.

16. A wind turbine in accordance with claim 13 wherein said joint comprises a torque tube having a torsional stiffness selected to allow said outer piece to achieve or approximate the target pitch value.

17. A wind turbine in accordance with claim 13 wherein said outer piece is aft swept and said inner piece is forward swept to provide a torsional moment acting in an opposite direction to that of said outer piece, to balance a torsional load of said assembled blade.

18. A method for assembling a rotor blade on a rotor of a wind turbine, said method comprising:
transporting at least two unassembled pieces of blade, the pieces including an outer blade part having an aft sweep and an inner blade part;
assembling at least the outer blade part and the inner blade part into a blade at a joint, the inner blade part having a blade root for coupling to a hub of the rotor, the inner blade part extending axially between the blade root and the joint, the outer blade part extending axially from the joint to a blade tip, the inner blade part and the outer blade part extending chordwise between a leading edge and a trailing edge and having an airfoil shape along the entire chordwise span, the outer blade part is twistable relative to the inner blade part to approximate a target pitch value when a given load condition occurs when the blade is fully assembled and coupled to the hub; and
assembling the blade onto the rotor of the wind turbine.

19. A method in accordance with claim 18 wherein said assembling at least the outer blade part and the inner blade part at a joint further comprises joining the outer blade part and the inner blade part using a torque tube exhibiting a torsional stiffness selected to allow the outer blade part to achieve or approximate the target pitch value.

20. A method in accordance with claim 18 wherein the outer blade part is constructed from at least one of a lighter weight material than the inner blade part and a different construction, than the inner blade part.

* * * * *